(12) United States Patent
Kobayashi

(10) Patent No.: US 10,962,098 B2
(45) Date of Patent: Mar. 30, 2021

(54) SLIDING CONTACT-TYPE WAVE GENERATOR AND STRAIN WAVE GEARING

(71) Applicant: HARMONIC DRIVE SYSTEMS INC., Tokyo (JP)

(72) Inventor: Masaru Kobayashi, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 479 days.

(21) Appl. No.: 15/758,377

(22) PCT Filed: Sep. 17, 2015

(86) PCT No.: PCT/JP2015/076580
§ 371 (c)(1),
(2) Date: Mar. 8, 2018

(87) PCT Pub. No.: WO2017/046930
PCT Pub. Date: Mar. 23, 2017

(65) Prior Publication Data
US 2018/0259054 A1   Sep. 13, 2018

(51) Int. Cl.
*F16H 1/32* (2006.01)
*F16H 49/00* (2006.01)

(52) U.S. Cl.
CPC ................ *F16H 49/001* (2013.01)

(58) Field of Classification Search
CPC ..................................................... F16H 49/001
(Continued)

(56) References Cited

U.S. PATENT DOCUMENTS

| 6,109,136 A | 8/2000 | Dold |
|---|---|---|
| 6,202,509 B1 | 3/2001 | Dold |

(Continued)

FOREIGN PATENT DOCUMENTS

| DE | 10 2009 024 418 | * 12/2010 |
|---|---|---|
| JP | 2008-180259 A | 8/2008 |
| JP | 2009-156461 A | 7/2009 |

OTHER PUBLICATIONS

International Search Report (PCT/ISA/210) dated Dec. 22, 2015, by the Japanese Patent Office as the International Searching Authority for International Application No. PCT/JP2015/076580.
(Continued)

*Primary Examiner* — William C Joyce
(74) *Attorney, Agent, or Firm* — Buchanan Ingersoll & Rooney PC

(57) ABSTRACT

A wave generator for a strain wave gearing is provided with a rigid plug having an ellipsoidal plug-outer-circumferential surface, and a ring-shaped displacement body that is flexed to an ellipsoidal shape by the plug. The ring-shaped displacement body is provided with a plurality of radially arranged displacing sections. The plug-contacting surfaces of the displacing sections are in sliding contact with the plug-outer-circumferential surface and when the plug rotates, the displacing sections are repeatedly displaced in the radial direction. By the displacement of the displacing sections, wave motion is generated in an external gear. It is possible to achieve a wave generator capable of generating wave motion in the external gear with a small rotational torque.

12 Claims, 8 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 6,736,028 B2* | 5/2004 | Ruttor | ..................... | F16H 25/06 |
| | | | | 74/640 |
| 6,776,067 B2* | 8/2004 | Bogelein | ............... | F16H 49/001 |
| | | | | 74/411 |
| 6,805,025 B2* | 10/2004 | Ruttor | ..................... | F16H 25/06 |
| | | | | 475/161 |

OTHER PUBLICATIONS

Written Opinion (PCT/ISA/237) dated Dec. 22, 2015, by the Japanese Patent Office as the International Searching Authority for International Application No. PCT/JP2015/076580.

* cited by examiner (a)

(b)

(a)

(b)

(c)

(a)

(b)

SLIDING CONTACT-TYPE WAVE GENERATOR AND STRAIN WAVE GEARING

TECHNICAL FIELD

The present invention relates to a strain wave gearing, and particularly to a wave generator for a strain wave gearing whereby an external gear capable of flexing in a radial direction is ellipsoidally flexed and partially meshed with a rigid internal gear, and the position where the external gear meshes with the internal gear is caused to move in a circumferential direction in conjunction with rotation.

BACKGROUND ART

In the most common type of wave generator (rolling-contact-type wave generator) for a strain wave gearing, balls, rollers, or other rolling bodies are typically caused to roll on an external peripheral side of an ellipsoidal plug to generate wave motion in an external gear. A rolling-contact-type wave generator is provided with a wave generator bearing mounted between an ellipsoidal outer circumferential surface of a plug that is a rigid body and an inner circumferential surface of a flexible external gear. The wave generator rotates in a state of rolling contact with the inner circumferential surface of the external gear, and causes each circumferential-direction portion of the external gear to oscillate at a specified amplitude in the radial direction. Such a wave generator is disclosed in Patent References 1 and 2, for example.

PRIOR ART DOCUMENTS

Patent Documents

Patent Document 1: JP 2008-180259 A
Patent Document 2: JP 2009-156461 A

SUMMARY OF THE INVENTION

Problems to be Solved by the Invention

Here, it is considered to use a type of wave generator in which an ellipsoidal plug in direct contact with the inner circumferential surface of an external gear is caused to slide along the inner circumferential surface, and wave motion is generated in the external gear (this type of wave generator being referred to hereinafter as a "sliding-contact-type wave generator"). In a sliding-contact-type wave generator, viscous resistance due to rotation is low, and there is almost no change in input torque even when the input speed is increased; therefore, efficiency during high-speed rotation is better than with a rolling-contact-type wave generator. However, the sliding-contact-type wave generator has drawbacks in terms of the high rotational torque for generating wave motion.

In view of the foregoing, an object of the present invention is to provide a sliding-contact-type wave generator that is configured so that wave motion can be generated in an external gear by a small rotational torque.

Means of Solving the Above Problems

In order to solve the abovementioned problems, according to the present invention, there is provided a wave generator for a strain wave gearing, in which the wave generator causes an external gear that is capable of flexing in a radial direction to flex in a non-circular shape, e.g., an ellipsoid, causes the external gear to partially mesh with a rigid internal gear, and causes a position where the external gear meshes with the internal gear to move in a circumferential direction in conjunction with rotation, the wave generator for a strain wave gearing being characterized by having a rigid plug provided with a plug-outer-circumferential surface having a non-circular shape, e.g., an ellipsoid, and an annular displacement body provided with a plurality of radially arranged displacing sections, wherein each of the displacing sections is a rigid body in the radial direction of the annular displacement body and is connected so as to be able to elastically displace in the radial direction relative to the displacing sections adjacent thereto, wherein each of the displacing sections is provided with a plug-contacting section in a state of sliding contact with the plug-outer-circumferential surface of the plug, and an external-gear-contacting section for flexing the external gear in the non-circular shape, e.g., ellipsoidally, and wherein the plug-contacting sections are positioned on an inside in the radial direction with respect to the external-gear-contacting sections.

The plug of the wave generator is rotationally driven by a motor or the like. The displacing sections of the annular displacement body are in a state of sliding contact with the non-circular, e.g., ellipsoidal, plug-outer-circumferential surface, and the displacing sections are therefore repeatedly displaced inward and outward in the radial direction in conjunction with the rotation of the plug. The displacing sections function as essentially rigid bodies in the radial direction, and wave motion is therefore generated in the external gear by the external-gear-contacting sections of the displacing sections. Specifically, external teeth of the external gear sequentially mesh with the internal gear along the circumferential direction, and relative rotation corresponding to the difference in the number of teeth between the gears occurs between the gears. For example, high-speed rotation inputted to the plug is dramatically reduced in speed and taken off from one gear.

In the wave generator, the plug-contacting surfaces of the displacing sections of the annular displacement body are in sliding contact with the ellipsoidal plug-outer-circumferential surface of the plug on a rotation side. In the displacing sections, the plug-contacting sections are positioned on the inside in the radial direction with respect to the external-gear-contacting sections. Consequently, wave motion can be generated in the external gear by rotating the plug with less rotational torque than in a case in which the non-circular, e.g., ellipsoidal, plug-outer-circumferential surface is brought into direct contact with the inner circumferential surface of the external gear and placed in sliding contact along the inner circumferential surface.

In the present invention, the displacing sections can be configured as linearly extending fins which are arranged at equiangular intervals and have the same cross section and the same length. In this case, inner end sections in the radial direction of the fins are the plug-contacting sections, and outer end sections in the radial direction of the fins are the external-gear-contacting sections. The outer end sections of adjacent fins are connected to each other by an arcuate plate capable of flexing in the radial direction, thereby constituting the annular displacement body.

The annular displacement body may also be configured as an annular body configured from a plurality of displacing section modules linked in the circumferential direction. Each of the displacing section modules is provided with first and second fin portions extending in the radial direction at a specified angle, and an arcuate plate portion for connecting outer end sections in the radial direction of the first and second fin portions to each other. In this case, in two displacing section modules adjacent in the circumferential direction, a layered fin having a structure in which the second fin of one displacing section module and the first fin of the other displacing section module are layered functions as a single displacing section.

The annular displacement body can furthermore be fabricated using a single bellows. In this case, undulating bent portions of the bellows each function as displacing sections. Specifically, each of the undulating bent portions of the bellows that function as the displacing sections is provided with a pair of first and second flat plate portions extending in the radial direction at a specified angle, an outer end arcuate plate portion for connecting outer ends of the first and second flat plate portions to each other, and first and second inner end arcuate plate portions formed in inner end sections of the first and second flat plate portions. Between displacing sections adjacent in the circumferential direction, the first inner end arcuate plate portion of one displacing section and the second inner end arcuate plate portion of the other displacing section are connected to each other. In this case, the outer end arcuate plate portions of the displacing sections function as external-gear-contacting sections, and the first and second inner end arcuate plate portions of the displacing sections function as plug-contacting sections.

A movement restricting section for restricting the annular displacement body from moving in the direction of a center axis of the plug is also preferably provided in order to prevent the plug-contacting sections of the annular displacement body from separating from the ellipsoidal plug-outer-circumferential surface.

The annular displacement body is also preferably provided with a retaining section for retaining the plug-contacting sections of the displacing sections in a predetermined position in the circumferential direction so that the displacing sections of the annular displacement body undergo repeated displacement with good precision in the radial direction by the rotation of the plug.

MODE FOR CARRYING OUT THE INVENTION

Figure 1:
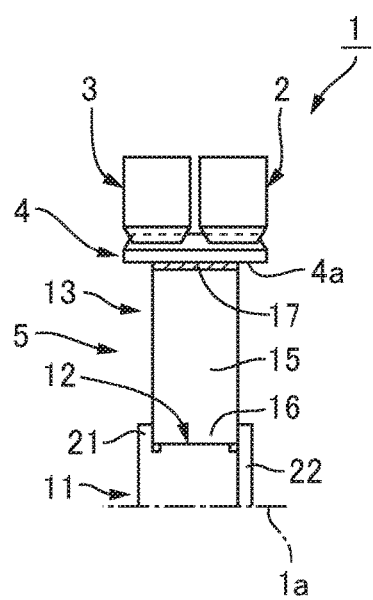
FIGS. 1(a) and 1(b) includes a rough longitudinal sectional view and a rough front view illustrating the flat-type strain wave gearing pertaining to Embodiment 1 of the present invention.
Figure 1:
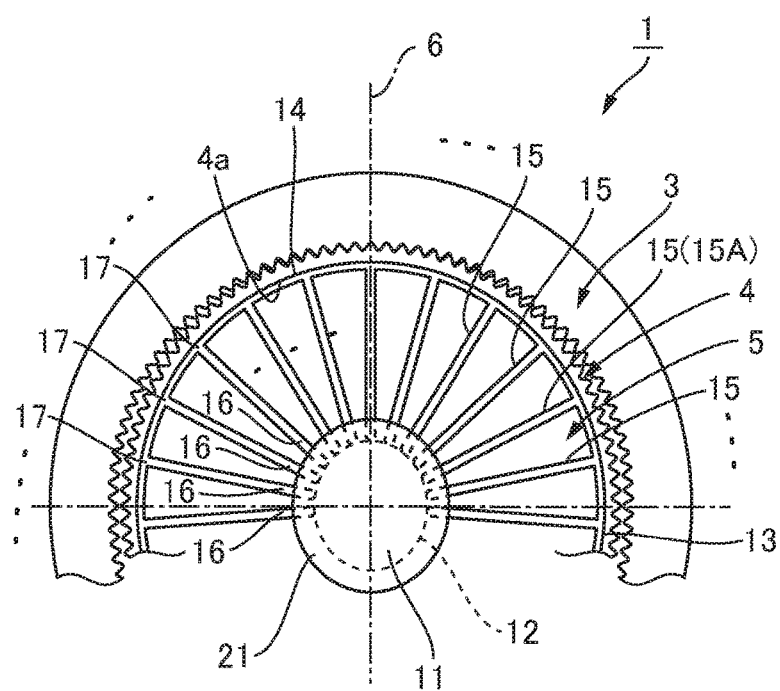

Embodiments of the strain wave gearing to which the present invention is applied are described below with reference to the accompanying drawings.

Embodiment 1

FIGS. 1(a) and 1(b) are a rough longitudinal sectional view and a rough front view, respectively, illustrating the flat-type strain wave gearing pertaining to Embodiment 1 of the present invention. The strain wave gearing 1 is provided with two rigid internal gears 2 and 3, a cylindrical flexible external gear 4, and a wave generator 5.

The internal gears 2 and 3 are disposed coaxially and in parallel. In speed reducer applications, one internal gear 2 is configured as a stationary-side internal gear that is fixed so as not to rotate, and the other internal gear 3 is configured as a driving-side internal gear for outputting speed-reduced rotation.

The external gear 4 is capable of meshing with both the internal gears 2 and 3, and is disposed coaxially therewith on the inside of the internal gears 2 and 3. The wave generator 5 is mounted on the inside of the external gear 4, and flexes the external gear 4 into an ellipsoidal shape so as to mesh it with both the internal gears 2 and 3 at both end positions of the major axis 6 of the ellipsoidal shape.

The driving-side internal gear 3 and external gear 4 are provided with the same number of teeth, and the number of teeth of the stationary-side internal gear 2 is 2n (where n is a positive integer) greater than the number of teeth of the internal gear 3 and the external gear 4. For each single rotation of the wave generator 5, the external gear 4 rotates relative to the stationary-side internal gear 2 through an angle corresponding to the tooth number difference. The external gear 4 and the internal gear 3 rotate integrally, and speed-reduced rotation is outputted from the internal gear 3 to a driven member.

The wave generator 5 is provided with a specified-thickness plug 11 that is a rigid body, an ellipsoidal plug-outer-circumferential surface 12 of the plug 11, and an annular displacement body 13 mounted between the plug-outer-circumferential surface 12 and an inner circumferential surface 4a of the external gear 4. An outer circumferential surface 14 of the annular displacement body 13 initially has a perfectly circular shape, and is ellipsoidally flexed by the plug-outer-circumferential surface 12. The external gear 4 is ellipsoidally flexed by the ellipsoidally flexed outer circumferential surface 14.

The annular displacement body 13 is provided with numerous radially arranged displacing sections 15. The displacing sections 15 function as rigid bodies provided with adequate rigidity in the radial direction of the annular displacement body 13. The displacing sections 15 are also connected so that each is capable of elastic displacement in the radial direction relative to the displacing sections adjacent thereto. Each of the displacing sections 15 is also provided with a plug-contacting section 16 in a state of sliding contact with the ellipsoidal plug-outer-circumferential surface 12, and an external-gear-contacting section 17 in contact with the inner circumferential surface 4a of the external gear 4.

Figure 2:
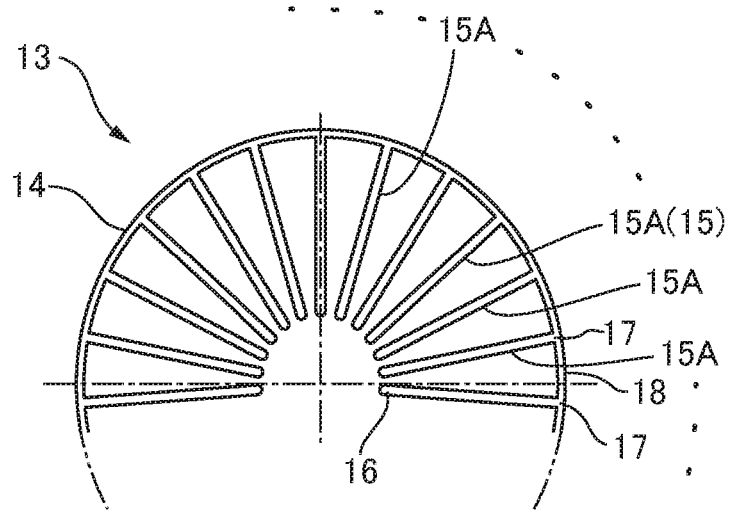
FIGS. 2(a), 2(b) and 2(c) includes a front view illustrating the annular displacement body, a front view illustrating a state in which the annular displacement body is spread out in a plane, and a plan view illustrating a state in which the annular displacement body is spread out in a plane.
Figure 2:
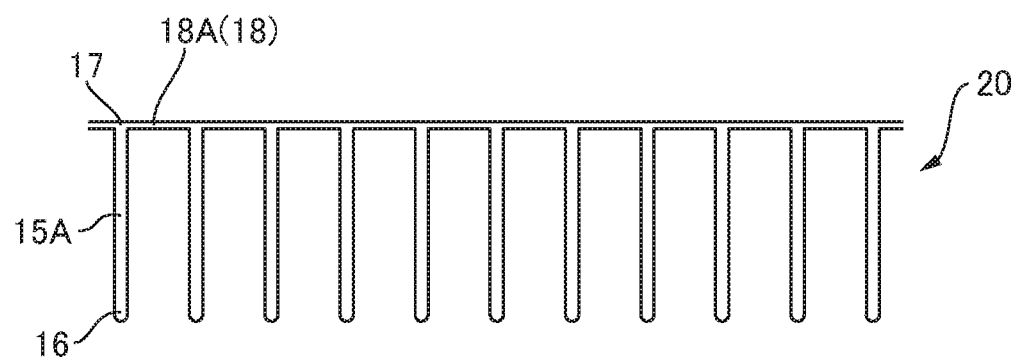
Figure 2:
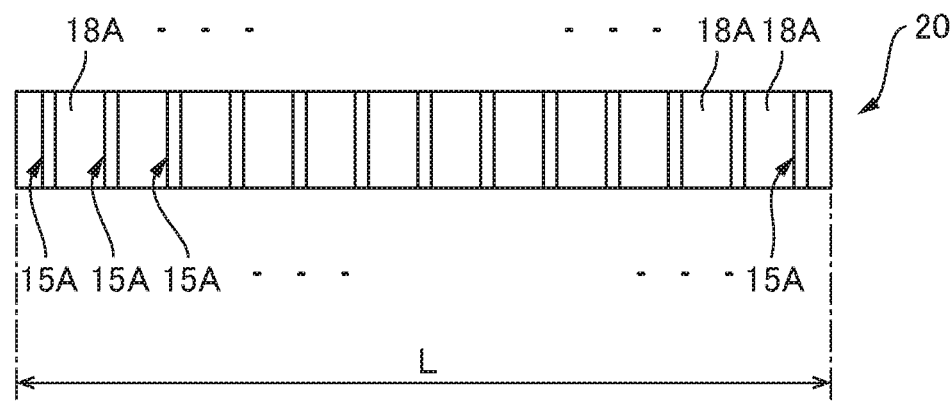

FIG. 2(a) is a front view illustrating the annular displacement body 13, and FIGS. 2(b) and 2(c) are a front view and a plan view, respectively, illustrating a state in which the annular displacement body 13 is spread out in a plane. As illustrated in FIGS. 1 and 2, the annular displacement body 13 of the present example is provided with linearly extending fins 15A as the displacing sections 15, the fins 15A having the same cross section and the same length. Inner end sections of the fins 15A in the radial direction thereof are the plug-contacting sections 16, and outer end sections thereof are the external-gear-contacting sections 17. The external-gear-contacting sections 17 of the fins 15A are connected to each other by a circular arcuate plate 18 capable of flexing in the radial direction.

The annular displacement body 13 can be fabricated from a structure 20 illustrated in FIGS. 2(b) and 2(c). In the structure 20, the fins 15A are disposed parallel to each other at a fixed interval, and the external-gear-contacting sections 17 at one end of the fins 15A are connected to each other by thin flat plate portions 18A having the same width.

A structure 20 having a length L corresponding to the inner circumferential surface 4a of the external gear 4 is fabricated, and is curled up into an annular shape with both ends thereof joined so that the fins 15A are positioned on the inside thereof, and the structure 20 is configured so that the outer circumferential surface 14 is a perfect circle, as illustrated in FIG. 2(a). The flat plate portions 18A are thereby curved to form the circular arcuate plate 18, and an annular displacement body 13 in which the fins 15A are radially arranged at intervals of equal angle is obtained.

When the plug 11 is mounted concentrically with a center portion of the annular displacement body 13, the fins 15A (displacing sections 15) are displaced in the radial direction by the ellipsoidal plug-outer-circumferential surface 12, as illustrated in FIG. 1(b). Outer ends of the external-gear-contacting sections 17 of the fins 15A of the annular displacement body 13 are thereby positioned on an ellipsoidal curve analogous to the ellipsoidal shape of the plug-outer-circumferential surface 12. The outer circumferential surface 14 of the annular displacement body 13 is thus elastically deformed from a perfect circle to an ellipsoidal curve defined by the external-gear-contacting section 17.

When the plug 11 is rotationally driven by a motor or the like not illustrated in the drawings, the plug-contacting sections 16 of the fins 15A in sliding contact with the plug-outer-circumferential surface 12 undergo repeated displacement in the radial direction. The fins 15A function as rigid bodies in the radial direction, and the external-gear-contacting sections 17 at the outer ends of the fins 15A are therefore repeatedly displaced in the radial direction in the same manner. As a result, the same functioning as a common rolling-contact-type wave generator is obtained, and the meshing position of the external gear 4 and the internal gears 2, 3 is moved in the circumferential direction. Relative rotation thereby occurs between the stationary-side internal gear 2 and the external gear 4.

The plug 11 in the present example is provided with movement restricting sections 21, 22 for restricting the annular displacement body 13 from moving in the direction of a center axis 1a, as illustrated in FIG. 1. The movement restricting section 21 is a circular annular projection protruding a predetermined amount outward in the radial direction from one end in a width direction of the plug-outer-circumferential surface 12 of the plug 11. The movement restricting section 21 has a circular outline encompassing the movement range of the inside ends of the fins 15A. The other movement restricting section 22 is a circular plate having a specified thickness fixed to an end surface of the plug 11 on the reverse side thereof. The outside diameter dimension of the movement restricting section 22 is the same as that of the movement restricting section 21. Movement of the annular displacement body 13 in the center axis 1a direction is restricted by the movement restricting sections 21, 22, and the inside ends of the fins 15A do not separate from the plug-outer-circumferential surface 12.

The rotational torque of the wave generator 5 of the present example will next be described. In the wave generator 5, the plug-contacting sections 16 of the fins 15A of the perfectly circular annular displacement body 13 are brought into contact with the plug-outer-circumferential surface 12 and ellipsoidally deformed. When the plug 11 rotates, the plug-contacting sections 16 also slide along the plug-outer-circumferential surface 12, and wave motion can be generated in the external gear 4 with little rotational torque.

Figure 3:
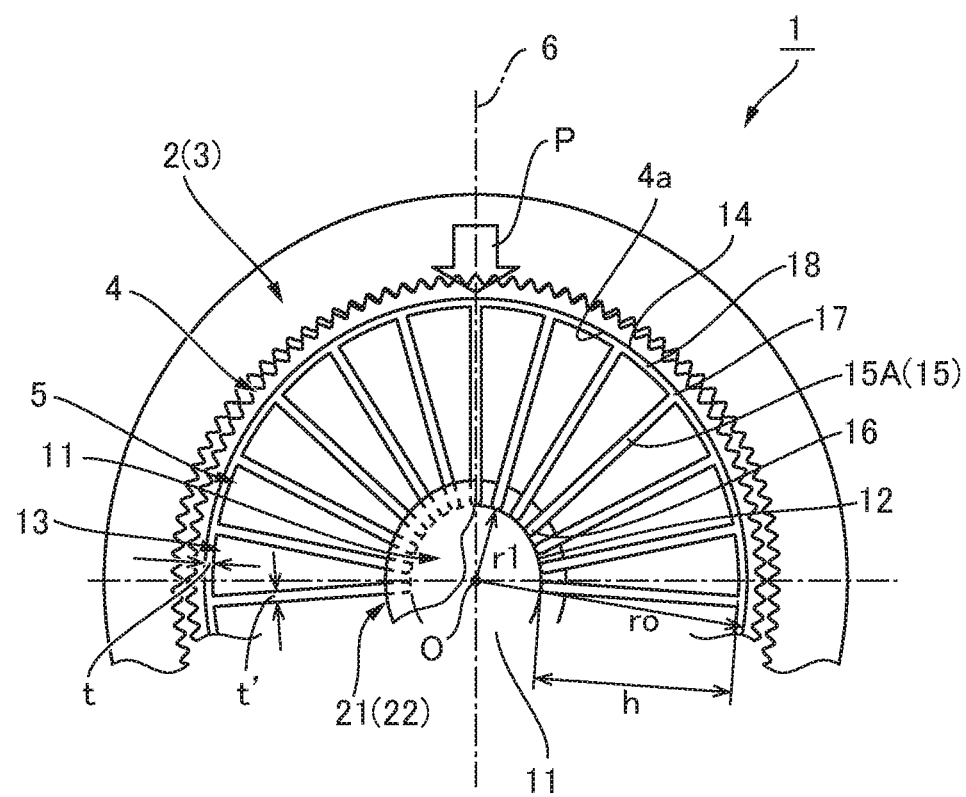
FIGS. 3(a) and 3(b) are an explanatory drawing illustrating the dimensions of each section of the annular displacement body of FIG. 1.
Figure 3:
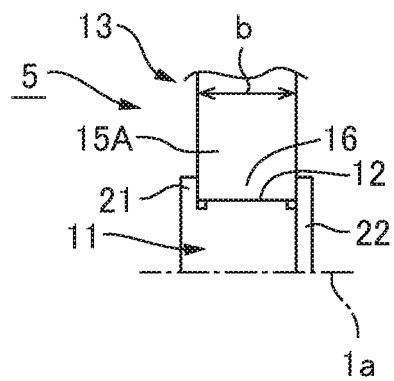

Specifically, as illustrated in FIG. 3, $r_0$: the radius of the position of contact of the annular displacement body 13 with the inner circumferential surface 4a of the external gear 4

(the distance from the center O to the position of contact between the inner circumferential surface 4a and the external-gear-contacting sections 17 of the fins 15A), $r_1$: the radius of the position of contact of the annular displacement body 13 with the plug-outer-circumferential surface 12

(the distance from the center O to the position of contact between the plug-outer-circumferential surface 12 and the plug-contacting sections 16 of the fins 15A)

P: the radial load at the position of the major axis 6, t: the plate thickness of the circular arcuate plate 18, t': the plate thickness of the fins 15A, and b: the plate width of the fins 15A.

Also, $\mu$ is the frictional coefficient of a contacting portion.

In this case, the rotational torque $T_0$ generated between the annular displacement body 13 and the external gear 4, and the rotational torque $T_1$ between the plug 11 and the annular displacement body 13 are expressed as indicated below.

$$T_0 = 2 \cdot r_0 \cdot \mu \cdot P$$

$$T_1 = 2 \cdot r_1 \cdot \mu \cdot P$$

Since $r_0 = r_1 + h$, $T_0 > T_1$. Consequently, when the frictional coefficients are the same, the rotational torque $T_1$ necessary in order to bring the plug 11 into sliding contact along the plug-contacting sections 16 of the annular displacement body 13 may be small relative to the rotational torque $T_0$ necessary to bring the plug into sliding contact along the inner circumferential surface 4a of the external gear 4. Therefore, setting the frictional coefficients of the contacting portions so as to be essentially the same makes it possible for the wave generator 5 of the present example to generate wave motion in the external gear 4 using a small rotational torque.

(Material/Shape of the Annular Displacement Body)

The annular displacement body 13 is preferably shaped so as to be easily flexed in ellipsoidal fashion overall. The annular displacement body 13 is more easily flexed the smaller the Young's modulus of the material of the annular displacement body 13 is, and the smaller the plate thickness t of the circular arcuate plate 18 connecting the fins 15A is.

The fins 15A of the annular displacement body 13 are preferably shaped so as to have adequate rigidity in the radial direction so as to function as rigid bodies in the radial direction. In the buckling load calculation for a flat plate, the buckling load is strongly related to the Young's modulus and the Poisson's ratio of the material, and the effect of the ratio b/h of the width b and the length h of the fins 15A is small. The fins 15A can therefore have an adequate length. Because the buckling load is also significantly affected by the plate thickness t' of the fins 15A, the plate thickness t' must be appropriately set.

The annular displacement body 13 can be fabricated from various materials such as steel, copper alloy, stainless steel, or plastic. A material yielding excellent molding workability, the necessary ease of flexing, and adequate rigidity in the radial direction is selected.

The plate thickness t' of the fins 15A is preferably 2 to 4 times the plate thickness t of the circular arcuate plate 18. The necessary ease of flexing and adequate rigidity in the radial direction are thereby easily obtained.

The plate width b of the fins 15A is preferably set to an appropriate dimension out of consideration for the tooth flank load distribution in the tooth width direction in the meshing portion between the external gear 4 and the internal gears 2, 3.

The length h (height) of the fins 15A is configured so as to be, for example, at least ⅓ the radius $r_0$ in the conventional strain wave gearing. The rotational torque can thereby be reduced by at least 30% relative to the conventional rolling-contact-type wave generator. The length h is determined by the plate thickness t' of the fins 15A and the necessary amount of ellipsoidality. In the inner end portions (near the plug-contacting sections 16) of the fins 15A, the length h of the fins 15A can be increased in a range such that adjacent fins 15A do not interfere with each other.

The number of fins 15A is preferably at least 17 in order to make it possible for the ellipsoidal shape of the plug-outer-circumferential surface 12 to be accurately transmitted to the external gear 4.

Embodiment 2

Figure 4:
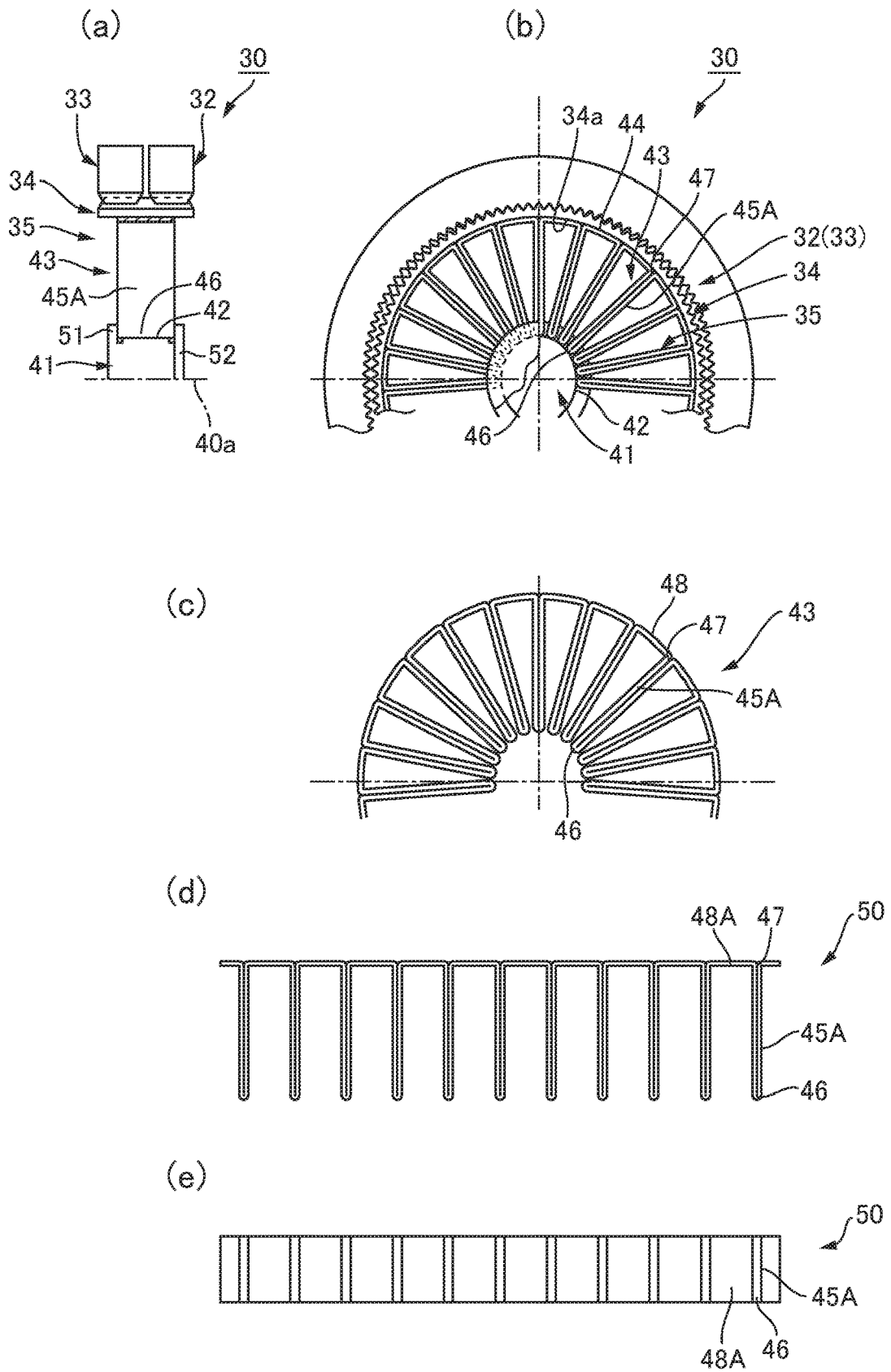
FIGS. 4(a), 4(b), 4(c), 4(d) and 4(e) includes a rough longitudinal sectional view and a rough front view illustrating the flat-type strain wave gearing pertaining to Embodiment 2 of the present invention, a front view illustrating the annular displacement body thereof, a front view illustrating a state in which the annular displacement body is spread out in a plane, and a front view illustrating a state in which the annular displacement body is spread out in a plane.

FIGS. 4(a) and 4(b) are a rough longitudinal sectional view and a rough front view, respectively, illustrating the flat-type strain wave gearing pertaining to Embodiment 2 of the present invention. FIG. 4(c) is a front view illustrating the annular displacement body thereof, and FIGS. 4(d) and 4(e) are a front view and a plan view, respectively, illustrating a state in which the annular displacement body is spread out in a plane.

The strain wave gearing 30 has the same basic configuration as the strain wave gearing 1 of Embodiment 1, and is provided with rigid internally toothed gears 32 and 33, a flexible external gear 34, and a wave generator 35. The wave generator 35 is provided with a plug 41 that is a rigid body provided with an ellipsoidal plug-outer-circumferential surface 42, and an annular displacement body 43.

The annular displacement body 43 of the present example is fabricated from a structure 50 having the shape illustrated in FIGS. 4(d) and 4(e). The structure 50 is fabricated by folding a single tape-shaped plate material in the direction perpendicular to the plate surface at a specified interval, the plate material having a specified width and a specified thickness. The structure 50 is provided with a plurality of layered fins 45A having a structure in which two sheet materials are layered, and external-gear-contacting sections 47 as top end sections of adjacent layered fins 45A are connected to each other by flat plate portions 48A.

The structure 50 is molded into a circular annular shape and both ends thereof are joined, whereby the flat plate portions 48A become arcuate plate portions 48, and an annular displacement body 43 provided with a perfectly circular outer circumferential surface 44 defined by the arcuate plate portions 48 is obtained, as illustrated in FIG. 4(c). A plug 41 provided with an ellipsoidal plug-outer-circumferential surface 42 is mounted coaxially with a center portion of the annular displacement body 43, and the wave generator 35 illustrated in FIGS. 4(a) and 4(b) is thereby obtained. The wave generator 35 is mounted inside the external gear 4.

Plug-contacting sections 46 which are inner end sections of the layered fins 45A of the annular displacement body 43 are placed in a state of sliding contact with the ellipsoidal plug-outer-circumferential surface 42. The layered fins 45A are displaced in the radial direction an amount corresponding to the position of contact thereof with the plug-outer-circumferential surface 42. The external-gear-contacting sections 47 as outer end sections of the layered fins 45A are thereby positioned on an ellipsoidal curve corresponding to the ellipsoidal shape of the plug-outer-circumferential surface 42, and the outer circumferential surface 44 of the annular displacement body 43 is deformed into an ellipsoidal shape that corresponds to the ellipsoidal shape of the plug-outer-circumferential surface 42.

Consequently, the external gear 34, the outer circumferential surface 44 (external-gear-contacting sections 47) of which is in contact with an inner circumferential surface 34a, is flexed into an ellipsoidal shape corresponding to the plug-outer-circumferential surface 42. Rotation of the plug 41 is accompanied by repeated displacement of the layered fins 45A of the annular displacement body 43 in the radial direction, and wave motion is therefore generated in the external gear 34.

A pair of movement restricting sections 51 and 52 for restricting movement in the direction of a center axis 40a of the annular displacement body 43 are provided in the plug 41 of the present example as well.

(Layered-Fin Retaining Section)

Figure 5:
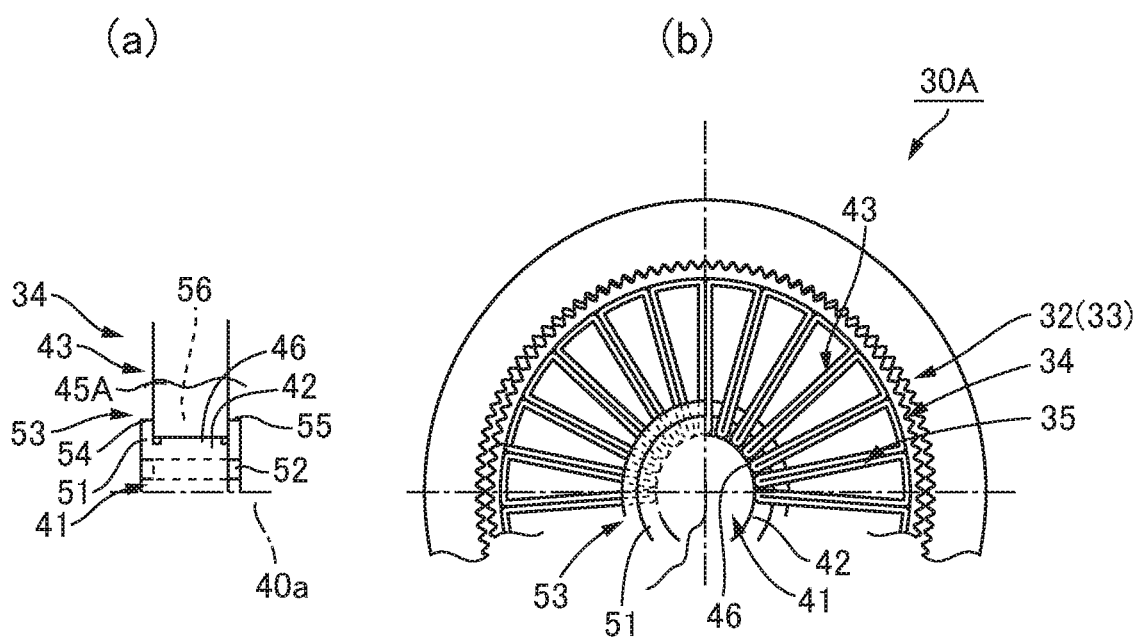
FIGS. 5(a) and 5(b) includes a rough longitudinal sectional view and a rough front view illustrating a modification of Embodiment 2.

FIGS. 5(a) and 5(b) are a rough longitudinal sectional view and a rough front view, respectively, illustrating a modification of the strain wave gearing 30 described above. In the strain wave gearing 30A of the present example, a retaining section 53 is provided so that the layered fins 45A (displacing sections) of the annular displacement body 43 undergo repeated displacement with good precision by the rotation of the plug 41.

The retaining section 53 retains the portions of the layered fins 45A on the side of the plug-contacting sections 46 thereof in a predetermined position in the circumferential direction. The retaining section 53 is provided with retaining section rings 54, 55 positioned on both sides of the layered fins 45A), and a plurality of retaining section partition plates 56 bridged between the retaining section rings 54, 55. The retaining section partition plates 56 are disposed at a specified angle interval, and the retaining section partition plates 56 are positioned between the layered fins 45A. The inner end parts of the layered fins 45A are retained at a specified angle interval by the retaining section partition plates 56.

The portions of the strain wave gearing 30A other than the retaining section 53 are the same as in the strain wave gearing 30, and therefore will not be described.

The retaining section 53 may, as shall be apparent, be used also in the wave generator 5 of the strain wave gearing 1 illustrated in FIG. 1.

Example of the Annular Displacement Body

Figure 6:
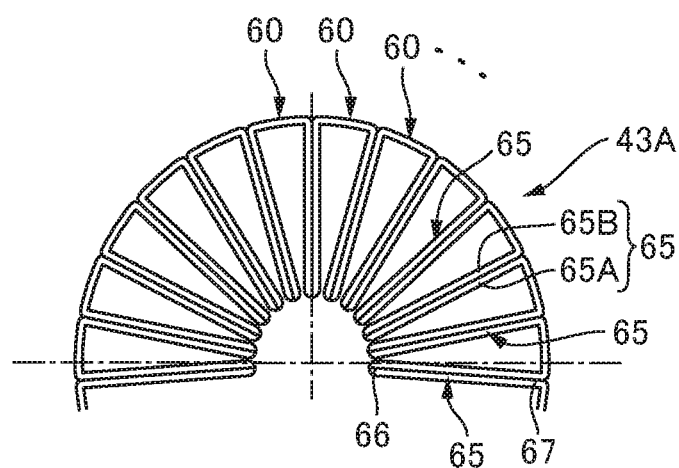
FIGS. 6(a), 6(b), 6(c) and 6(d) includes a front view illustrating another example of the annular displacement body, a front view illustrating a displacing section module thereof, a front view illustrating a state in which two displacing section modules are linked and fixed in the circumferential direction, and a front view illustrating a state in which four displacing section modules are linked and fixed in the circumferential direction.
Figure 6:
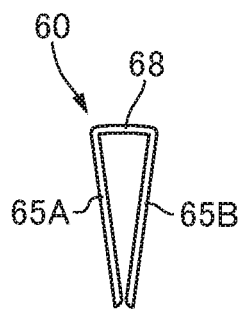
Figure 6:
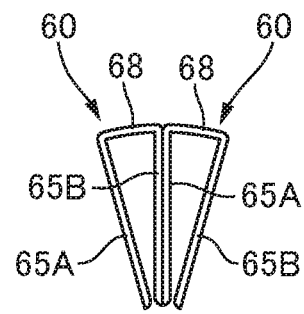
Figure 6:
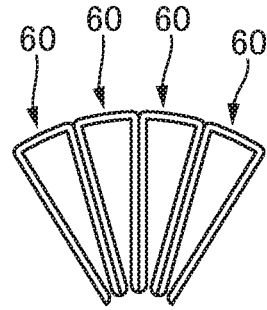

FIG. 6(*a*) is a front view illustrating another example of the annular displacement body, FIG. 6(*b*) is a front view illustrating a displacing section module thereof, FIG. 6(*c*) is a front view illustrating a state in which two displacing section modules are linked and fixed in the circumferential direction, and FIG. 6(*d*) is a front view illustrating a state in which four displacing section modules are linked and fixed in the circumferential direction.

The annular displacement body 43A of the present example is an annular body configured from a plurality of displacing section modules 60 linked in the circumferential direction. The displacing section modules 60 are fabricated by folding a plate material of specified width and specified thickness to form a fan shape spanning a predetermined angle. Alternatively, the displacing section modules 60 are integrally molded by injection molding of plastic or the like.

Each of the displacing section modules 60 is provided with first and second fin portions 65A, 65B extending in the radial direction at a specified angle, and an arcuate plate portion 68 for connecting outer end sections in the radial direction of the first and second fin portions 65A, 65B to each other, as illustrated in FIG. 6(*b*). As illustrated in FIGS. 6(*c*) and 6(*d*), the displacing section modules 60 are concentrically linked in the circumferential direction, and constitute the annular displacement body 43A illustrated in FIG. 6(*a*). A method that is appropriate for the material of the displacing section modules 60 (such as cementing, welding, or fusing) is used to join or link the displacing section modules 60.

In the annular displacement body 43A, first and second fin portions 65A, 65B of adjacent displacing section modules 60 are layered to form a single layered fin 65 (displacing section).

Inner end sections of the layered fins 65 are plug-contacting sections 66, and outer end sections of the layered fins 65 are external-gear-contacting sections 67.

[Procedure for Fabricating the Annular Displacement Body]

Figure 7:
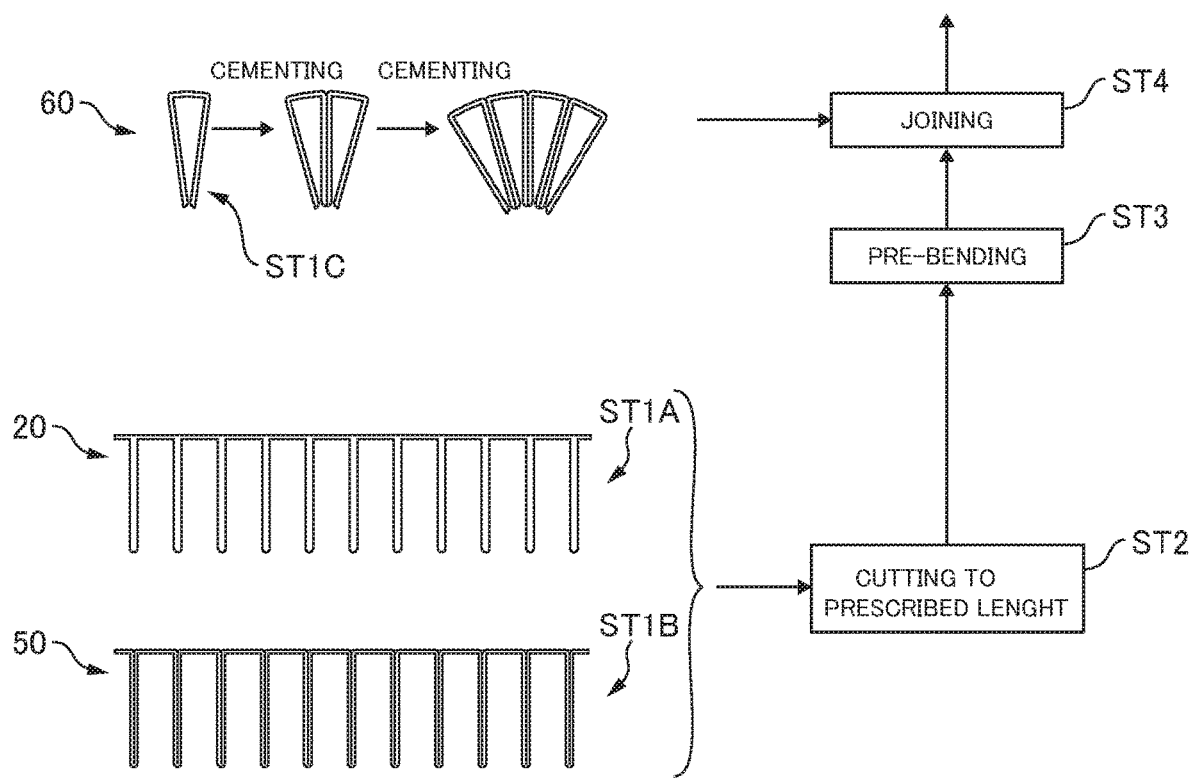
FIG. 7 is an explanatory drawing illustrating the procedure for fabricating the annular displacement body.

FIG. 7 is an explanatory drawing illustrating the procedure for fabricating the annular displacement bodies 13, 43, and 43A described above. As illustrated in FIG. 7, in the case of the annular displacement body 13 or 43, the structure 20 or 50 is fabricated (steps ST1A, 1B), the structure is cut to a prescribed length (step ST2), pre-bending (step ST3) is performed to form an annular shape, and both ends thereof are then joined (step ST4). In the case of the annular displacement body 43A, the displacing section modules 60 are fabricated (step ST1C) and concentrically joined in the circumferential direction (step ST4).

Embodiment 3

Figure 8:
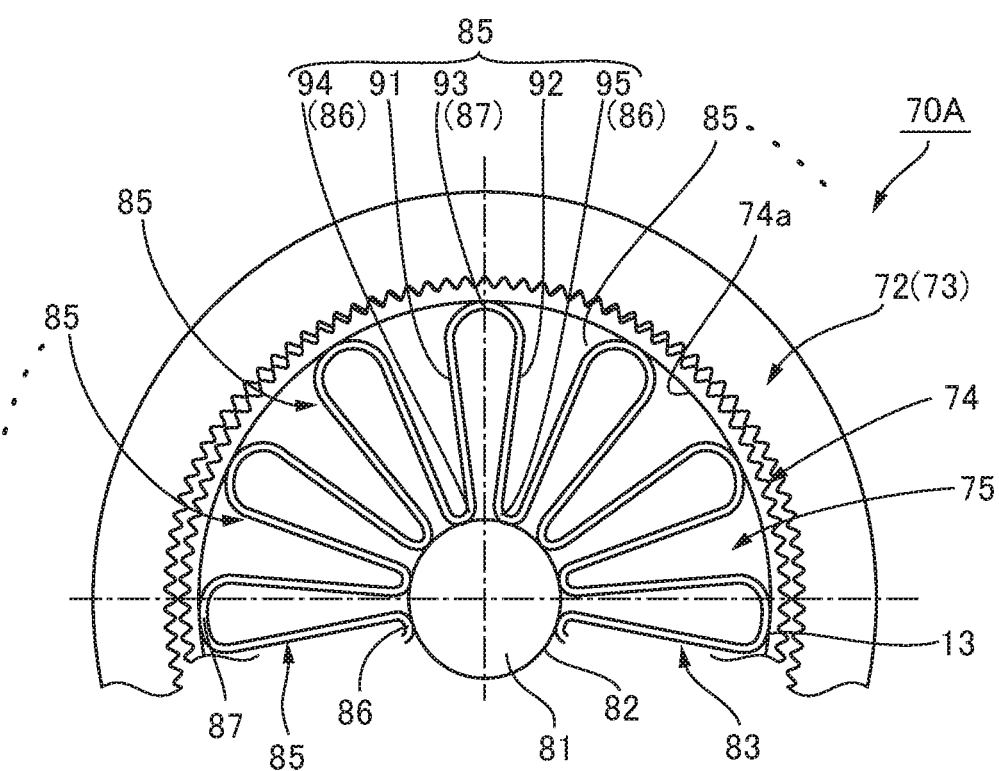
FIGS. 8(a) and 8(b) includes a rough front view illustrating the strain wave gearing pertaining to Embodiment 3, and a front view illustrating another example of the annular displacement body.
Figure 8:
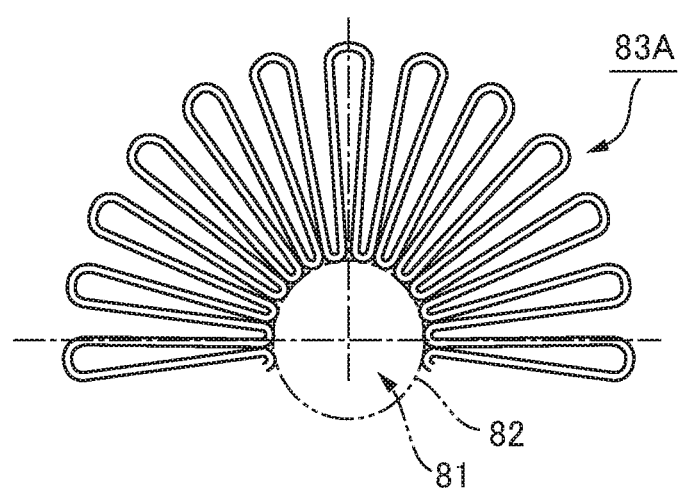

FIG. 8(*a*) is a view illustrating the strain wave gearing pertaining to Embodiment 3 of the present invention. The strain wave gearing 70A has the same basic configuration as the strain wave gearing 1 illustrated in FIG. 1, and is provided with rigid internal gears 72 and 73, a flexible external gear 74, and a wave generator 75.

The wave generator 75 is provided with a rigid plug 81 that is provided with an ellipsoidal plug-outer-circumferential surface 82, and an annular displacement body 83. The annular displacement body 83 is a bellows-shaped annular body, and is provided with numerous radially arranged displacing sections 85. The displacing sections 85 function as rigid bodies provided with adequate rigidity in the radial direction of the annular displacement body 83. The displacing sections 85 are also connected so that each is able to elastically displace in the radial direction relative to the displacing sections adjacent thereto. Each of the displacing sections 85 is also provided with a plug-contacting section 86 in a state of sliding contact with the ellipsoidal plug-outer-circumferential surface 82, and an external-gear-contacting section 87 in contact with the inner circumferential surface 74*a* of the external gear 74.

Specifically, the annular displacement body 83 is fabricated by molding a single bellows of specified width and specified thickness into an annular shape and joining both ends thereof. Undulating bent portions of the bellows each function as displacing sections 85.

Specifically, each of the undulating bent portions of the bellows for functioning as the displacing sections 85 is provided with a pair of first and second flat plate portions 91, 92 extending in the radial direction at a specified angle, a substantially semicircular outer end arcuate plate portion 93 for connecting outer ends of the first and second flat plate portions 91, 92 to each other, and first and second inner end arcuate plate portions 94, 95 formed in inner end sections of the first and second flat plate portions 91, 92. Between displacing sections 85 adjacent in the circumferential direction, the first inner end arcuate plate portion 94 of one displacing section 85 and the second inner end arcuate plate portion 95 of the other displacing section 85 are connected to each other.

In the annular displacement body 83 having this shape, the outer end arcuate plate portions 93 of the displacing sections 85 function as external-gear-contacting sections 87, and the first and second inner end arcuate plate portions 94, 95 of the displacing sections 85 function as plug-contacting sections 86.

(Another Example of a Bellows-Shaped Annular Displacement Body)

FIG. 8(*b*) is a view illustrating another example of the annular displacement body 83. The basic configuration of the annular displacement body 83A is the same as that of the annular displacement body 83 described above. The annular displacement body 83A differs, however, in having an increased number of displacing sections 85A constituting the annular displacement body 83A. Increasing the number of displacing sections 85A makes it possible to more accurately transmit the ellipsoidal shape of the plug-outer-circumferential surface to the external gear 74.

OTHER EMBODIMENTS

In the examples described above, the wave generator of the present invention is applied to a flat-type strain wave gearing. The wave generator of the present invention can also be applied to a cup-type strain wave gearing in which the external gear is cup shaped, or a top-hat-type strain wave gearing in which the external gear is top-hat shaped.

The examples described above also each relate to a wave generator provided with an ellipsoidal plug. When an external gear meshes with an internal gear at three locations in the circumferential direction, a three-lobed shape is adopted for the outline shape of the plug. The present invention can also, as shall be apparent, be applied when the shape of the outer circumferential surface of the plug is a non-circular shape other than an ellipsoidal shape.

The invention claimed is:

1. A wave generator for a strain wave gearing, in which the wave generator causes an external gear that is capable of flexing in a radial direction to flex in a non-circular shape, causes the external gear to partially mesh with a rigid internal gear, and causes a position where the external gear meshes with the internal gear to move in a circumferential direction in conjunction with rotation, the wave generator for the strain wave gearing comprising:
   a rigid plug provided with a plug-outer-circumferential surface having a non-circular shape, and
   an annular displacement body provided with a plurality of radially arranged displacing sections,
   wherein each of the displacing sections is a rigid body in a radial direction of the annular displacement body and is connected so as to be able to elastically displace in the radial direction relative to the displacing sections adjacent thereto,
   wherein each of the displacing sections is provided with a plug-contacting section in a state of sliding contact with the plug-outer-circumferential surface of the plug, and an external-gear-contacting section for flexing the external gear in the non-circular shape,
   wherein the plug-contacting sections are positioned on an inside in the radial direction with respect to the external-gear-contacting sections,
   wherein the displacing sections are linearly extending fins which are arranged at equiangular intervals and have the same cross section and the same length;
   inner end sections in a radial direction of the fins are the plug-contacting sections;
   outer end sections in the radial direction of the fins are the external-gear-contacting sections; and
   the outer end sections of the fins arranged adjacent to each other are connected to each other by an arcuate plate capable of flexing in the radial direction;
   wherein the annular displacement body is fabricated by folding a single tape-shaped plate material in a direction perpendicular to a plate surface at a specified interval, the plate material having a specified width and a specified thickness;
   each of the fins is a layered fin having a structure in which two sheet-material portions are layered, the sheet-material portions being formed by folding the sheet material; and
   the two sheet-material portions, which are layered with each other to form each layered fin, have inner end sections and outer end sections, the inner end sections being connected to each other, the outer end sections being folded toward opposite directions along the circumferential direction and being connected respectively to the arcuate plates that are adjacent to the outer end sections in the circumferential direction.

2. The wave generator for the strain wave gearing according to claim 1,
   wherein the plug is provided with a movement restricting section for restricting the annular displacement body from moving in a direction of a center axis of the plug.

3. The wave generator for the strain wave gearing according to claim 1,
   wherein the annular displacement body is provided with a retaining section for retaining the plug-contacting sections of the displacing sections in a predetermined position in the circumferential direction.

4. A strain wave gearing comprising:
   the wave generator as set forth in claim 1.

5. A wave generator for a strain wave gearing, in which the wave generator causes an external gear that is capable of flexing in a radial direction to flex in a non-circular shape, causes the external gear to partially mesh with a rigid internal gear, and causes a position where the external gear meshes with the internal gear to move in a circumferential direction in conjunction with rotation, the wave generator for the strain wave gearing comprising:
   a rigid plug provided with a plug-outer-circumferential surface having a non-circular shape, and
   an annular displacement body provided with a plurality of radially arranged displacing sections,
   wherein each of the displacing sections is a rigid body in a radial direction of the annular displacement body and is connected so as to be able to elastically displace in the radial direction relative to the displacing sections adjacent thereto,
   wherein each of the displacing sections is provided with a plug-contacting section in a state of sliding contact with the plug-outer-circumferential surface of the plug, and an external-gear-contacting section for flexing the external gear in the non-circular shape,
   wherein the plug-contacting sections are positioned on an inside in the radial direction with respect to the external-gear-contacting sections,
   wherein the displacing sections are linearly extending fins which are arranged at equiangular intervals and have the same cross section and the same length;
   inner end sections in a radial direction of the fins are the plug-contacting sections;
   outer end sections in the radial direction of the fins are the external-gear-contacting sections; and
   the outer end sections of the fins arranged adjacent to each other are connected to each other by an arcuate plate capable of flexing in the radial direction,
   wherein the annular displacement body is an annular body configured from a plurality of displacing section modules linked in a circumferential direction,
   wherein each of the displacing section modules is provided with first and second fin portions extending in the radial direction at a specified angle, and an arcuate plate portion for connecting outer end sections in the radial direction of the first and second fin portions to each other, and
   wherein each of the fins is a layered fin that has a structure in which, in two displacing section modules adjacent in the circumferential direction, the second fin of one displacing section module and the first fin of the other displacing section module are layered.

6. The wave generator for the strain wave gearing according to claim 5,
   wherein the plug is provided with a movement restricting section for restricting the annular displacement body from moving in a direction of a center axis of the plug.

7. The wave generator for the strain wave gearing according to claim 5,
   wherein the annular displacement body is provided with a retaining section for retaining the plug-contacting sections of the displacing sections in a predetermined position in the circumferential direction.

8. A strain wave gearing comprising:
   the wave generator as set forth in claim 5.

9. A wave generator for a strain wave gearing, in which the wave generator causes an external gear that is capable of flexing in a radial direction to flex in a non-circular shape, causes the external gear to partially mesh with a rigid internal gear, and causes a position where the external gear meshes with the internal gear to move in a circumferential direction in conjunction with rotation, the wave generator for the strain wave gearing comprising:

a rigid plug provided with a plug-outer-circumferential surface having a non-circular shape, and an annular displacement body provided with a plurality of radially arranged displacing sections, wherein each of the displacing sections is a rigid body in a radial direction of the annular displacement body and is connected so as to be able to elastically displace in the radial direction relative to the displacing sections adjacent thereto, wherein each of the displacing sections is provided with a plug-contacting section in a state of sliding contact with the plug-outer-circumferential surface of the plug, and an external-gear-contacting section for flexing the external gear in the non-circular shape, wherein the annular displacement body is fabricated by molding a single bellows of specified width and specified thickness into an annular shape and joining both ends thereof; and undulating bent portions of the bellows are arranged at equiangular intervals and function as the displacing sections, wherein each of the undulating bent portions comprises:

a pair of first and second flat plate portions extending in the radial direction at a specified angle;

an outer end arcuate plate portion for connecting outer ends of the first and second flat plate portions to each other; and first and second inner end arcuate plate portions formed in inner end sections of the first and second flat plate portions, wherein, between the undulating bent portions adjacent in the circumferential direction, the first inner end arcuate plate portion of one undulating bent portion and the second inner end arcuate plate portion of the other undulating bent portion are connected to each other to form an inner end arcuate plate portion, and wherein the outer end arcuate plate portions of the undulating bent portions are the external-gear-contacting sections, and the inner end arcuate plate portions of the undulating bent portions are the plug-contacting sections.

10. The wave generator for the strain wave gearing according to claim 9, wherein the plug is provided with a movement restricting section for restricting the annular displacement body from moving in a direction of a center axis of the plug.

11. The wave generator for the strain wave gearing according to claim 9, wherein the annular displacement body is provided with a retaining section for retaining the plug-contacting sections of the displacing sections in a predetermined position in the circumferential direction.

12. A strain wave gearing comprising:

the wave generator as set forth in claim 9.

* * * * *